United States Patent [19]
Grüdl

[11] Patent Number: 5,705,874
[45] Date of Patent: Jan. 6, 1998

[54] DISC FOR ELECTRODYNAMICS MOTORS

[75] Inventor: Josef Grüdl, Löchgau, Germany

[73] Assignee: Gerhard Geiger GmbH & Co., Germany

[21] Appl. No.: 767,559

[22] Filed: Dec. 16, 1996

Related U.S. Application Data

[63] Continuation of PCT/EP96/00687 Feb. 19, 1996.

[51] Int. Cl.⁶ .............. H02K 1/00; H02K 1/12; H02K 15/00
[52] U.S. Cl. .......... 310/216; 310/217; 310/258; 310/259; 29/596; 29/598
[58] Field of Search ............ 310/216, 42, 259, 310/258, 217; 29/596, 598, 606

[56] References Cited

U.S. PATENT DOCUMENTS

| | | | |
|---|---|---|---|
| 2,343,354 | 3/1944 | Wolf et al. | 310/216 |
| 3,440,460 | 4/1969 | Postema | 310/42 |
| 3,802,066 | 4/1974 | Barrett | 29/596 |
| 3,842,493 | 10/1974 | Ohuchi et al. | 29/596 |
| 4,176,444 | 12/1979 | Walker | 29/596 |
| 4,638,201 | 1/1987 | Feigel | 310/216 |
| 4,829,206 | 5/1989 | Honshima et al. | 310/214 |

*Primary Examiner*—Thomas M. Dougherty
*Assistant Examiner*—Michael J. Wallace, Jr.
*Attorney, Agent, or Firm*—Schweitzer Cornman Gross & Bondell LLP

[57] ABSTRACT

The invention relates to a disc (10) for the magnetic circuit of an electrodynamic motor with a central opening (12) and segments (14, 16) disposed about said opening (12), said segments having radially aligned legs (18, 20) and if necessary peripherally-extending arms (22, 25), said legs defining winding grooves (30) radially accessible from the exterior with openings (32) formed in the region of the free radial ends of the legs (20). The openings (32) may be closed by bending the legs (18, 20) and/or the arms (22, 24) (FIG. 1).

13 Claims, 12 Drawing Sheets

DISC FOR ELECTRODYNAMICS MOTORS

This is a continuation of application Ser. No. PCT/EP96/00687, filed on Feb. 19, 1996.

The invention relates to a disc according to the preamble of claim 1.

Such discs are for example disclosed in the Japanese Patent Application 5-236682 and are used for manufacturing a plate packet for electrodynamic motors constructed from a plurality of annular sheet metal discs. In the known case the openings are disposed in the region of the radial ends of the legs and are enclosed by means of an enclosed ring with projections. This has the disadvantage that the rings occupy additional space and on the other hand must be separately connected with each disc. A similar situation obtains with discs as described in U.S. Pat. No. 5,187,858. Finally, there is disclosed in U.S. Pat. No. 6 28377 a stator packet for electrodynamic motors whose openings are centrally formed and are enclosed by means of a cylinder. Radially, the winding grooves have openings for the magnetic flux. In this way the magnetic flux is clearly improved.

Proceeding from the above prior art, the object underlying the invention is to provide assistance here.

This set object is achieved according to the invention by the features of claim 1.

It is recognised that the invention is achieved when a disc is involved in which the openings for winding are disposed asymmetrically with respect to the winding grooves, and are formed in the region of the free ends of the radially aligned legs. The respectively peripherally extending leg or the radially extending arm in this case are made of flexible material, e.g. steel, and after winding of the stator packet may be bent so that the grooves are closed. Thus rings are unnecessary. In addition, the external dimensions of the stator are reduced at least by the radial thickness of the ring. The ends of the arms facing one another and of the legs may in addition be connected e.g. by welding or soldering.

Consequently, a substantial advantage of the measures proposed consists in the reduction of individual parts, minimisation of the external dimensions of the stator packet and a simpler assembly and winding of said stator packet. For after formation of the stator packet the winding grooves are preferably clad with insulating material, in one single process step. The stator packet is then automatically wound and finally the openings for winding are closed by bending the legs and/or the arms. If necessary, the ends facing one another of the ends and of the arms may be rigidly connected together, e.g. by welding, soldering, gluing or the like. This procedure is technically much easier to realise than it is to provide the stator packet with a common ring or separate rings by means of which the openings are conventionally closed. During cladding of the winding grooves, simultaneously hollow shafts disposed axially on the ends may be injection moulded on, by means of which winding is simplified. For such purposes insulating material is regularly used which hardens after the injection process, but does not appreciably influence the magnetic flux. Finally, in order to improve the magnetic flux, the central opening of the discs may be enlarged in such a way that no further metallic barrier exists between the opening and the respective winding grooves, which could impair the magnetic flux. In this case mutually adjacent segments are held together by the insulation material. After winding, the user obtains a wound stator packet ready for use, all manufacturing stages, starting with stamping of the discs and terminating with enlargement of the internal diameter of the opening, being capable of being carried out automatically.

Further appropriate and advantageous developments of the invention will become apparent from the sub-claims.

In a particularly appropriate development, the arms and/or the legs are made of flexible materials. By means of these measures, the winding grooves of the discs, combined to form a packet, may be entirely enclosed e.g. by welding. A disc is obtained in which the winding grooves are closed and thus the rigidity of the disc considerably increased.

In a further appropriate development of the invention, the openings are in the form of radially extending slots, enabling simple winding of the discs. Furthermore, the radially-aligned legs are slotted in their inner area. By these measures, contacting of the ends facing one another of the legs and of the arms may be simply achieved. In a further appropriate development, the peripherally extending arms have predetermined bending points. These measures also enable a rapid connection between the terminal parts of the legs and arms.

In a particularly appropriate development of the invention, the peripherally extending arms each comprise two legs, between which is respectively formed a slot, the outer leg being bendable towards the inner leg, closing the opening. Thus it is appropriate if the slot tapers in an inward direction. Within the scope of this inventive idea, it is particularly advantageous if predetermined bending points are formed for the outer legs in the region of connection of the legs and if, in the bent condition of the outer legs, said outer legs may be positively connectable together both with the inner legs and with the radially aligned legs, which taper towards their free ends, forming a duct for a weld seam. This measure means that the shape of the winding groove is not changed, not even when the outer legs have been bent. Therefore damage to the winding wires cannot occur.

In another appropriate development of the invention, the winding grooves are coated with insulating material, said winding grooves merging into grooves filled with insulating material on the radial side, and which extend as far as the opening. These measures achieve an electrically contact-free connection between the winding wire and the disc. In a particularly appropriate development of the invention, the grooves filled With insulating material respectively operationally connect to adjacent segments. By means of this measure the magnetic flux flows from the winding grooves into the opening unhindered.

The invention also relates to a method of manufacturing such discs. In this case the procedure is such that firstly a disc blank is produced with winding grooves and if necessary grooves. Thereupon the discs are combined to form a stator plate packet and the winding grooves and grooves are covered or filled with suitable insulating material and wound. The diameter of the central opening is also enlarged so that the annular web holding the segments together is eliminated, and the grooves covered with insulating material, which are preferably rectangular in cross-section, extend as far as the opening. Finally, the ends facing one another of the arms and of the legs are connected by being bent together.

Some embodiments of the invention given by way of example are shown diagrammatically in the drawing and will be explained in more detail in the following. Shown are:

FIG. 11: the stator packet shown in FIG. 10 with winding grooves covered and shafts moulded on;

Figure 1:
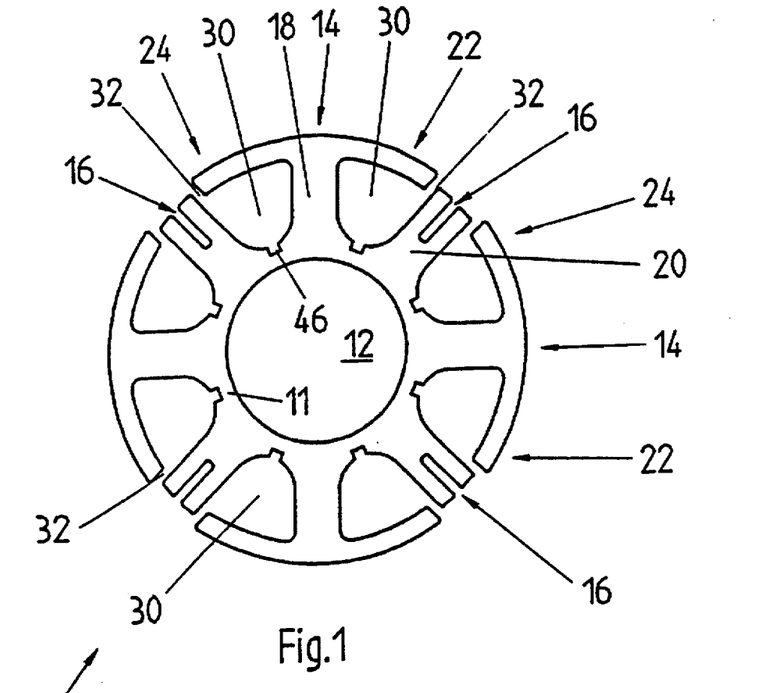
FIG. 1: a disc blank.
Figure 2:
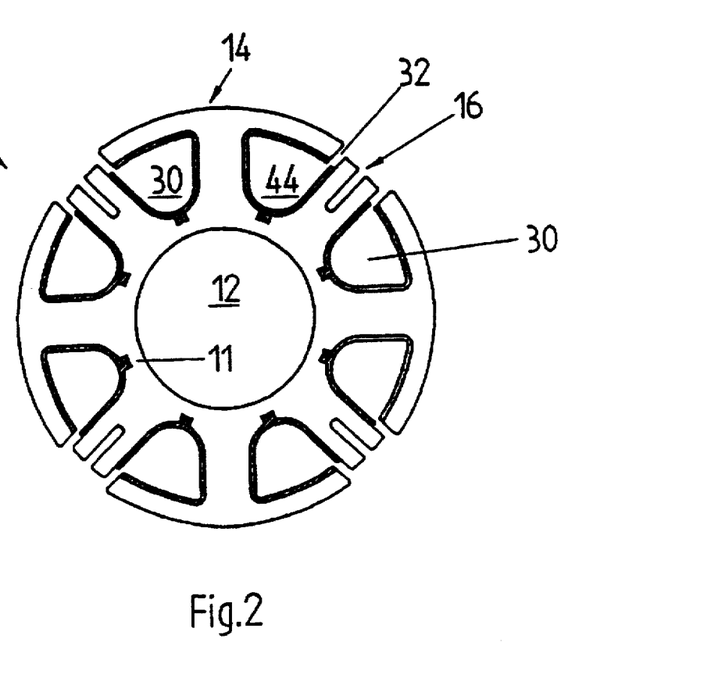
FIG. 2: the disc shown in FIG. 1 with winding grooves covered with insulating material.
Figure 3:
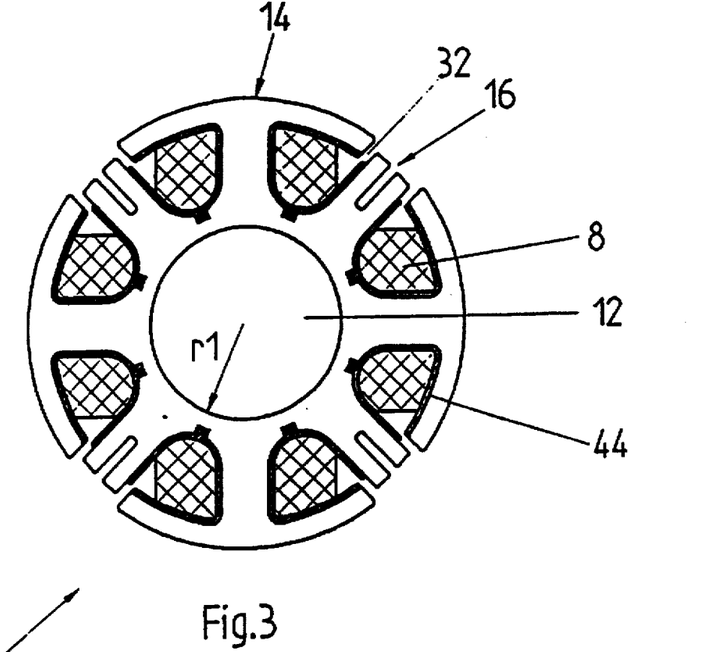
FIG. 3: the disc shown in FIG. 2 with wound winding grooves.
Figure 4:
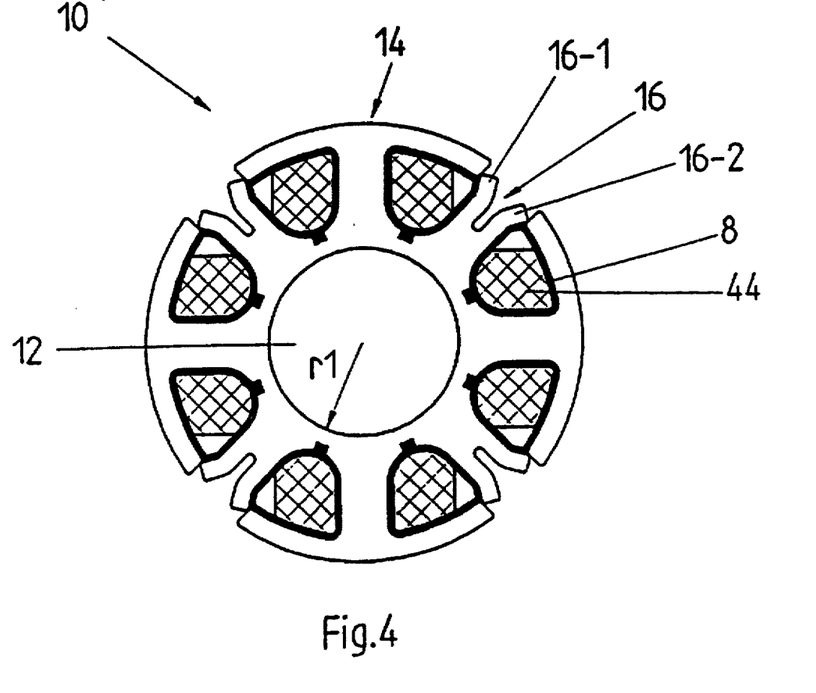
FIG. 4: the disc shown in FIG. 3, the ends facing one another of the legs and arms being disposed relative to one another without spacing.
Figure 5:
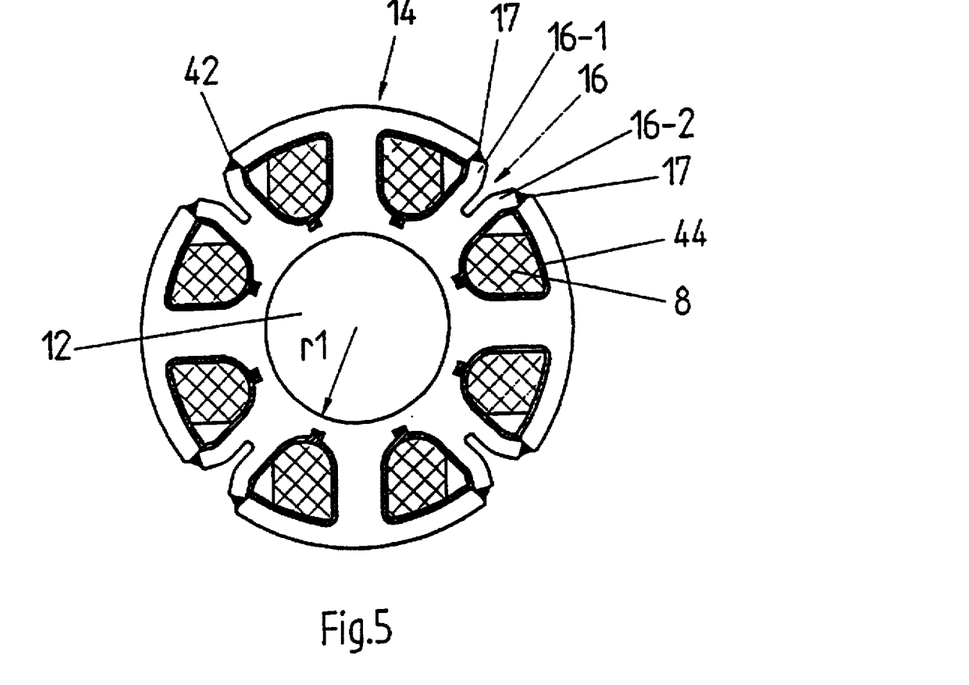
FIG. 5: the disc shown in FIG. 4, the arms and legs in contact being connected by welding.
Figure 6:
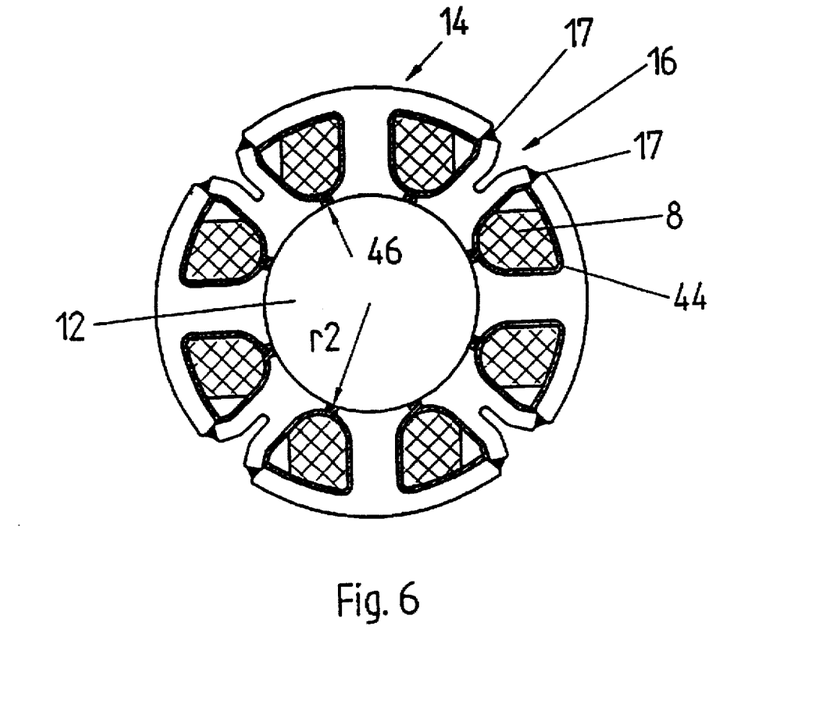
FIG. 6: the disc shown in FIG. 5, in which the central opening has been enlarged to a radius $r_2$.
Figure 9:
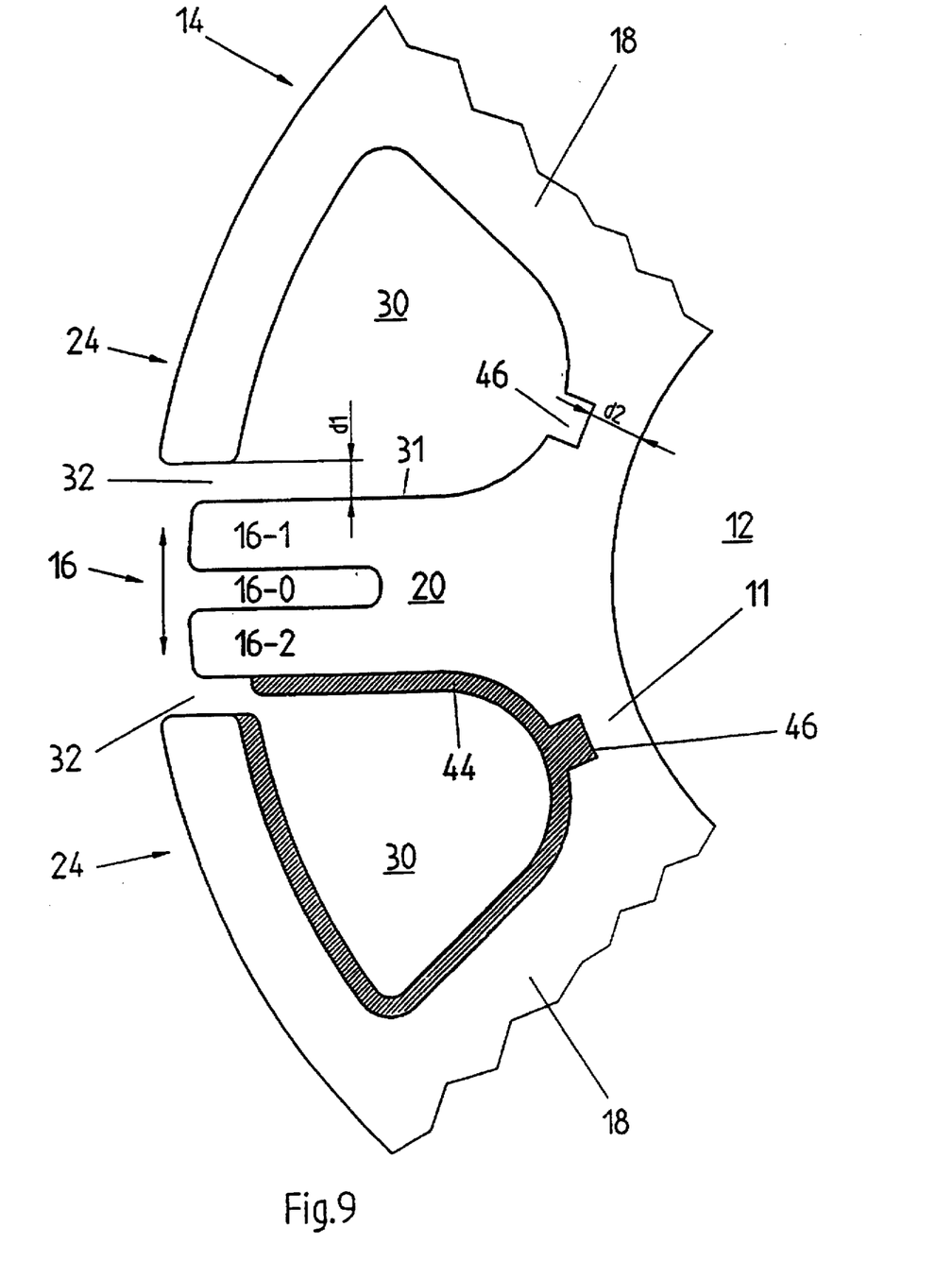
FIG. 9: a detail of a disc shown on an enlarged scale.

There is seen in FIG. 1, in conjunction with FIG. 9, a disc 10 for the magnetic circuit of an electrodynamic motor. In this case there are provided a central opening 12 and segments 14, 16 disposed around this opening and connected together by non-magnetic or electrically non-conductive material. The segments 14, 16 are provided with radially-aligned legs 18, 20, if necessary having peripherally extending arms 22, 24, said legs 18, 20 defining winding grooves 30 with openings 32 which are accessible radially from the exterior. The openings 32 are formed in the region of the free radial ends of the legs 20. The arms 22, 24 and the legs 18, 20 are formed from flexible material. The width d1 of the opening 32 is greater than the thickness of the winding wire, which is not shown in further detail. It will further be seen that the openings 32 are in the form of radially-extending slots, so that the winding wire can be passed along the inner wall 31 of the winding groove 30. The radially-aligned legs 20 are slotted in their terminal region and may be bent over without difficulty. In front of the winding, the winding grooves 30 are covered with insulating material 44, as FIG. 2 shows for example. It will further be seen that the winding grooves 30 merge into radial grooves 46 filled with insulating material 44, and which initially have a spacing $d_2$ from the central opening 12. At this stage the opening 12 of the disc 10 has an internal diameter $r_1$. After winding and closure of the slots, this internal diameter $r_1$ is enlarged, to a value $r_2$ (see FIG. 6), so that the grooves 46 filled with insulating material connect the winding grooves 30 with the central opening 12. This ensures that the magnetic flux in an inward direction into the central opening 12 is guaranteed.

Figure 7:
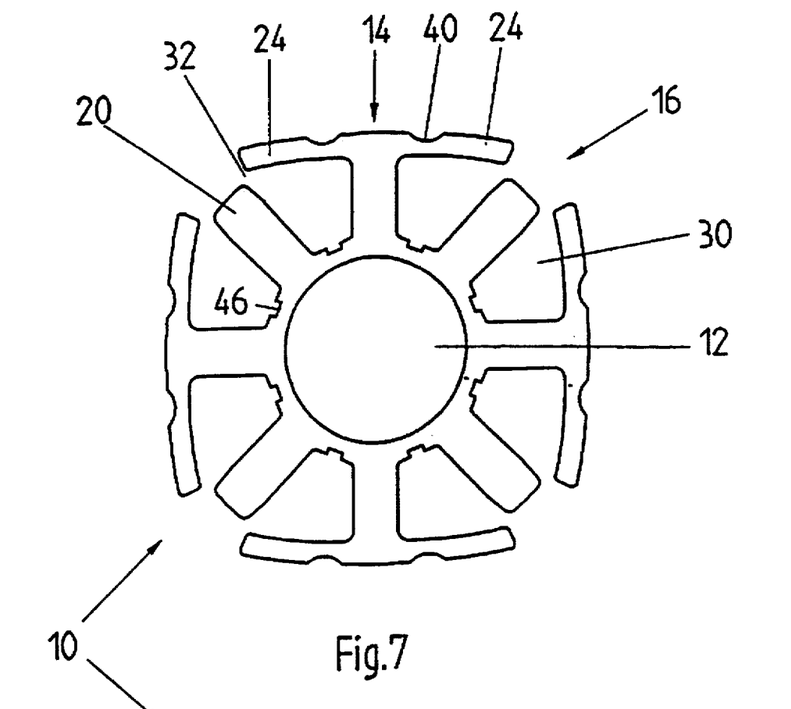
FIG. 7: a further disc.
Figure 8:
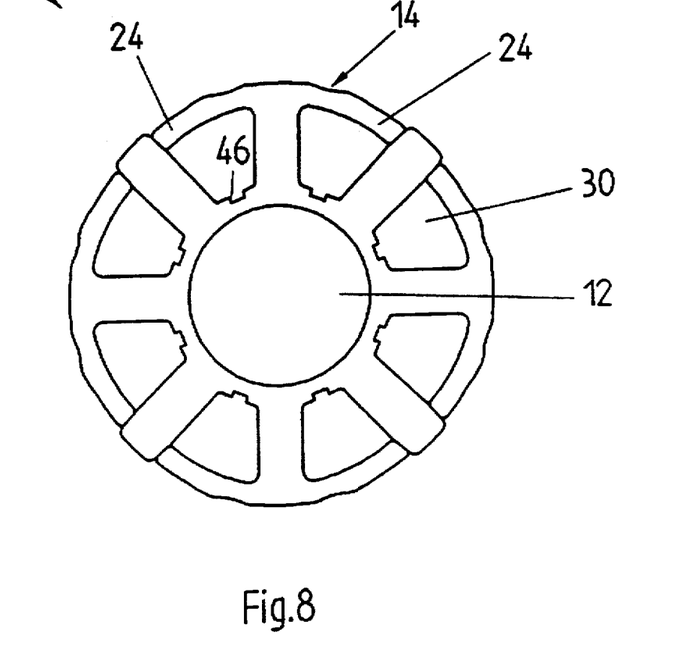
FIG. 8: the disc shown in FIG. 7 with bent arms.

FIGS. 7 and 8 show a disc whose arms have predetermined bending points 40 and, after winding of the discs, are bent towards the free ends of the legs 20. These discs are stamped parts, in which the segments 14, 16 are alternately T-shaped and tooth-shaped with slots 16-0. The portions 16-1 and 16-2 flanking the slot 16-0 can be bent to the free ends of the arms 24 after winding of the winding grooves 30, and may be connected thereto for example by welding.

Figure 16:
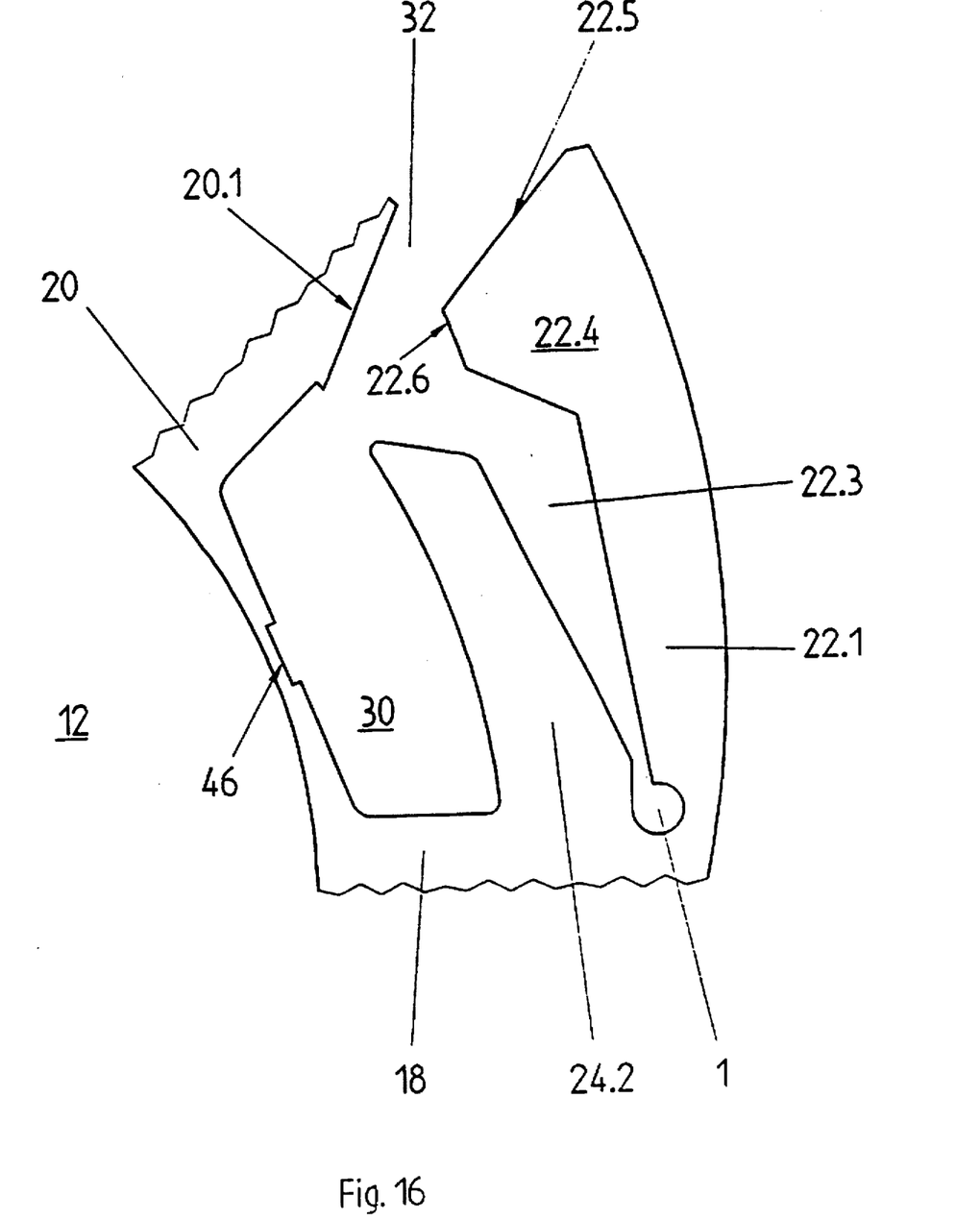
FIG. 16: the part identified by XVI according to FIG. 15, shown on an enlarged scale.
Figure 17:
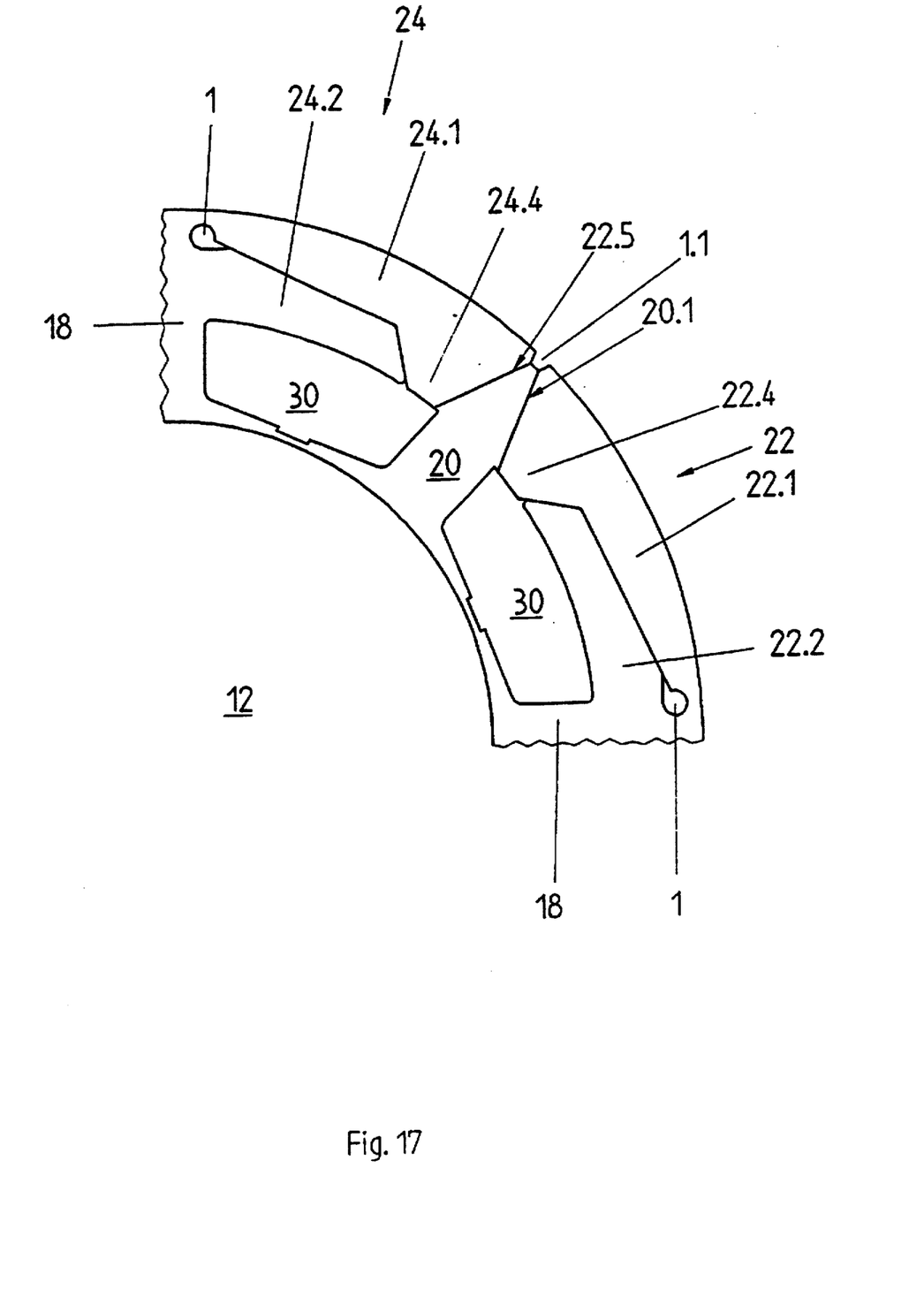
FIG. 17: the portion identified by XVII according to FIG. 15 shown on an enlarged scale.

FIGS. 14 to 17 show a stator plate packet or a disc of the packet, the particular feature of this disc being that the peripherally extending arms 22, 24 respectively comprise two legs 22.1, 22.2 or 24.1, 24.2, between which there is formed a slot 22.3 or 24.3, and the outer leg 22.1 or 24.1 may be bent towards the inner leg 22.2 or 24.2 (see FIG. 17). The opening 32 is thus closed. The slot 22.3 or 24.3 tapers in an inward direction in such a way that, in the area of connection of the legs 22.1, 22.2. or 24.1, 24.2, predetermined bending points 1 of the outer legs 22.1 and 24.1 are formed. In the bent condition of the outer legs 22.1, 24.1, the outer legs 22.1 and 24.1 together with the inner legs 22.2, 24.2 and also the legs 20, which taper towards their free ends, may be connected positively together forming a duct 1.1 for a welding groove. The advantage of this embodiment resides in the fact that the winding grooves 30 covered with insulating material are not deformed by bending of the outer legs 22.1, 24.1, as the shape of the winding grooves is constant and the inner legs 22.2, 24.2 are not bent, and this ensures that the insulating material is not removed from the inner wall of the winding groove 30.

FIGS. 16 and 17 show that the sides 20.1 and 22.5 facing one another in the bent condition of the outer legs may be positively connected together. Thus the end side 22.6 of the head 22.4 closes the actual opening 32 of the winding groove 30. After winding of the stator packet and bending of the legs 22.1 and 24.1, these legs if necessary can be welded in the region of the duct 1.1. Due to the special design of this disc, manufacture of the stator packet is particularly simple and its winding is problem-free.

The following is the procedure for manufacture of the proposed discs:

Firstly a disc blank (FIG. 1) with winding grooves and a central opening 12 whose radius $r_1$ is such that a web 11 is formed between the central opening 12 and the grooves 46, is manufactured for example by stamping.

Figure 10:
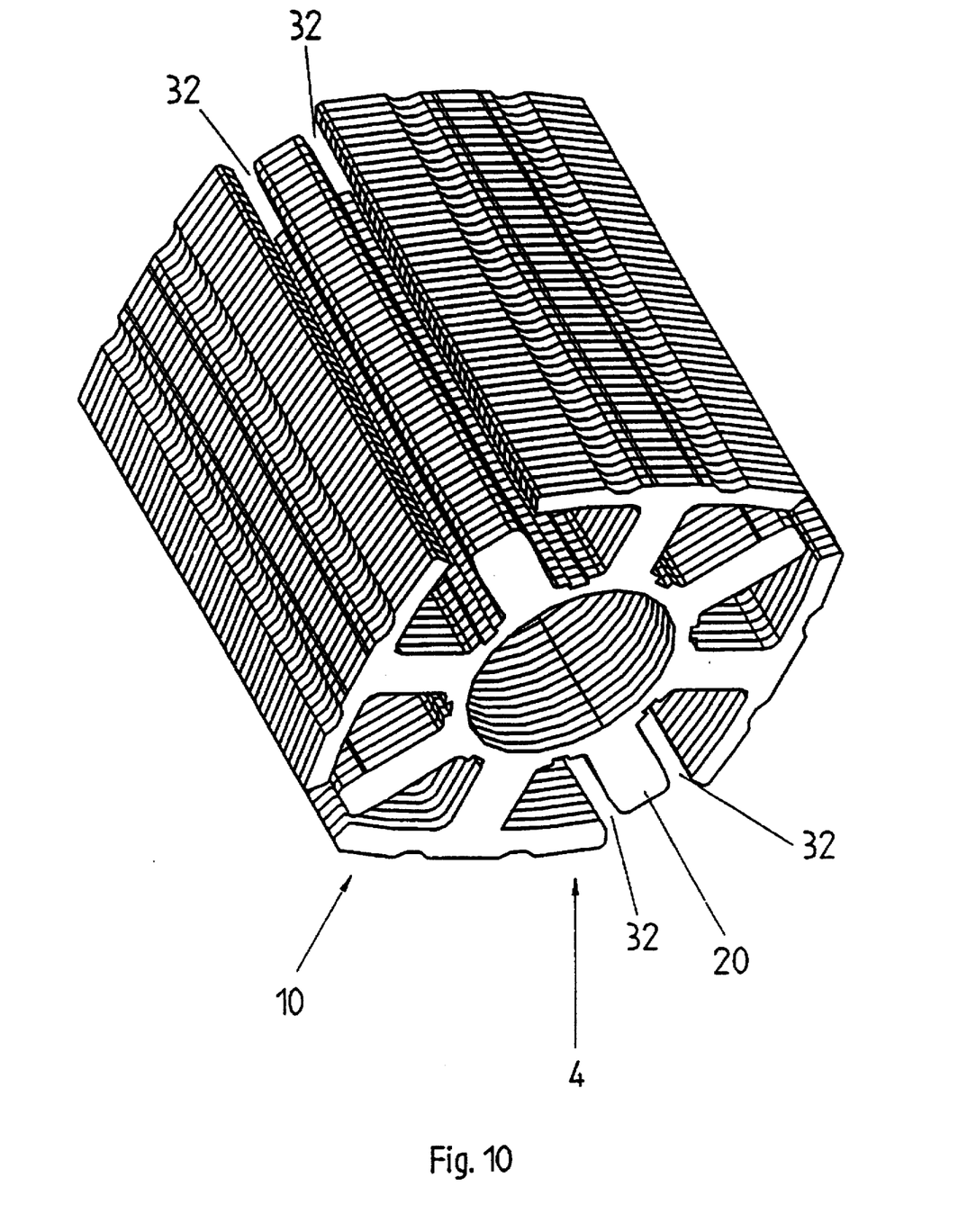
FIG. 10: a stator plate packet comprising discs as shown in FIG. 7.
Figure 11:
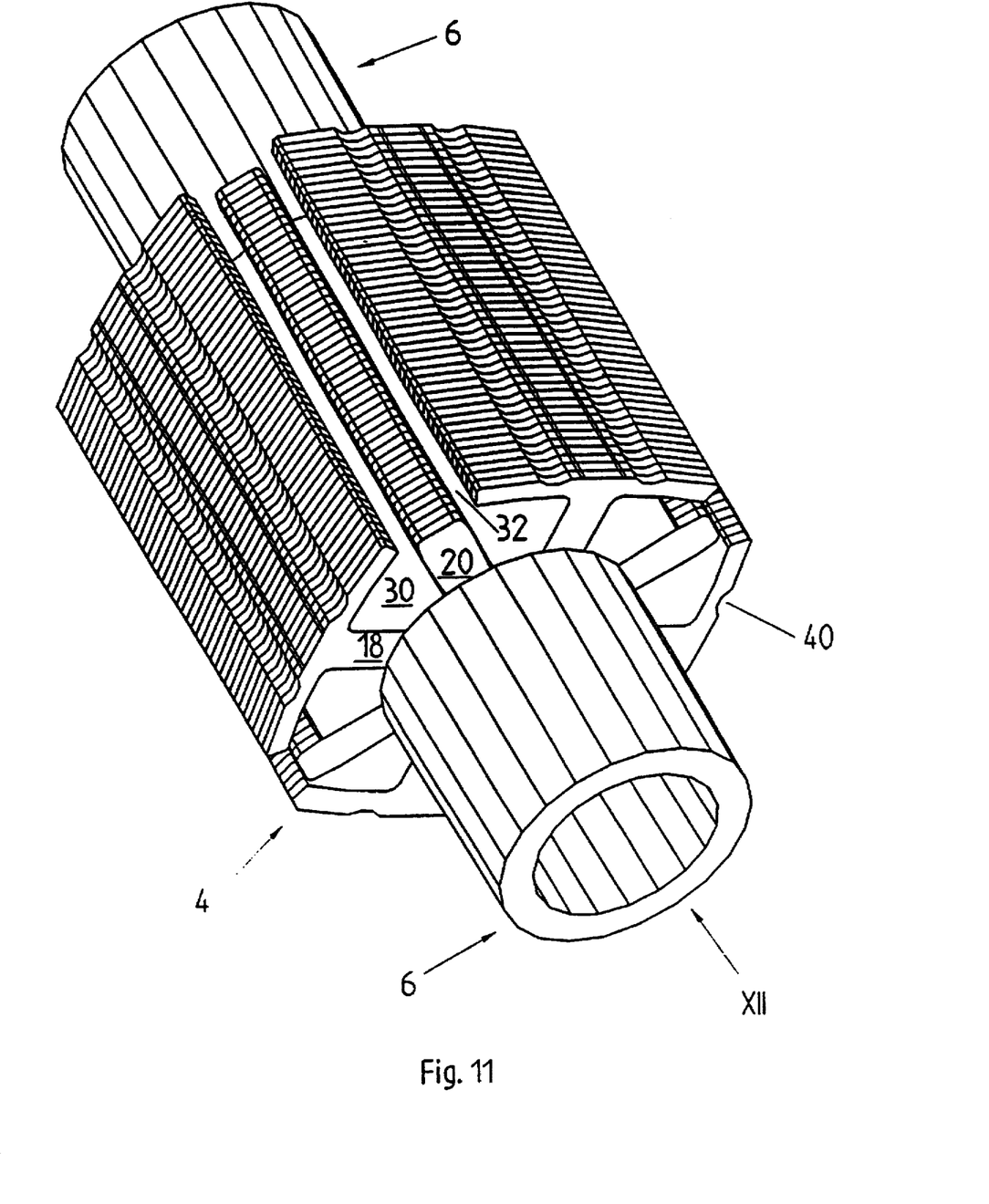
Figure 12:
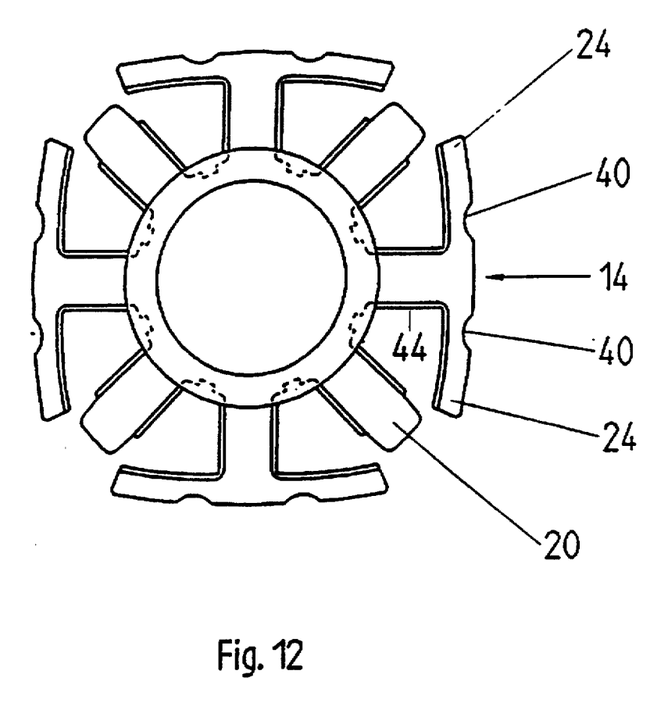
FIG. 12: an elevation in the direction of arrow XII according to FIG. 11.
Figure 13:
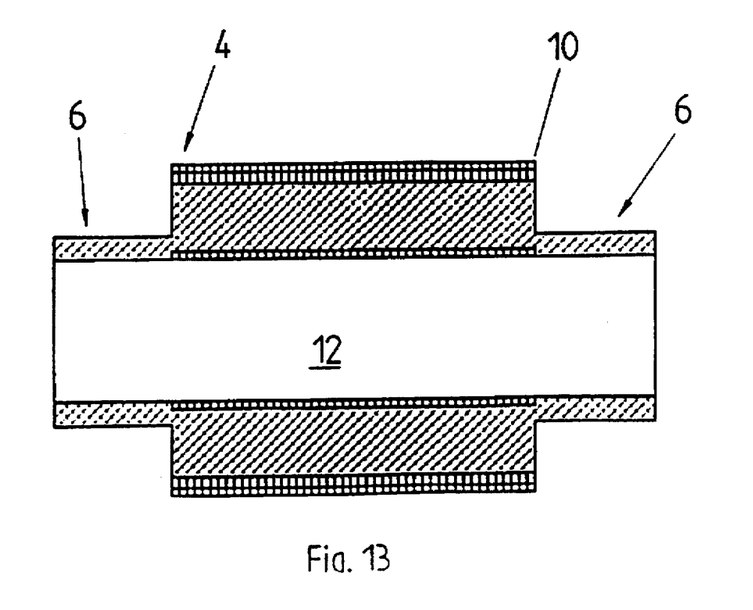
FIG. 13: an axial section through the stator packet according to FIG. 11.
Figure 14:
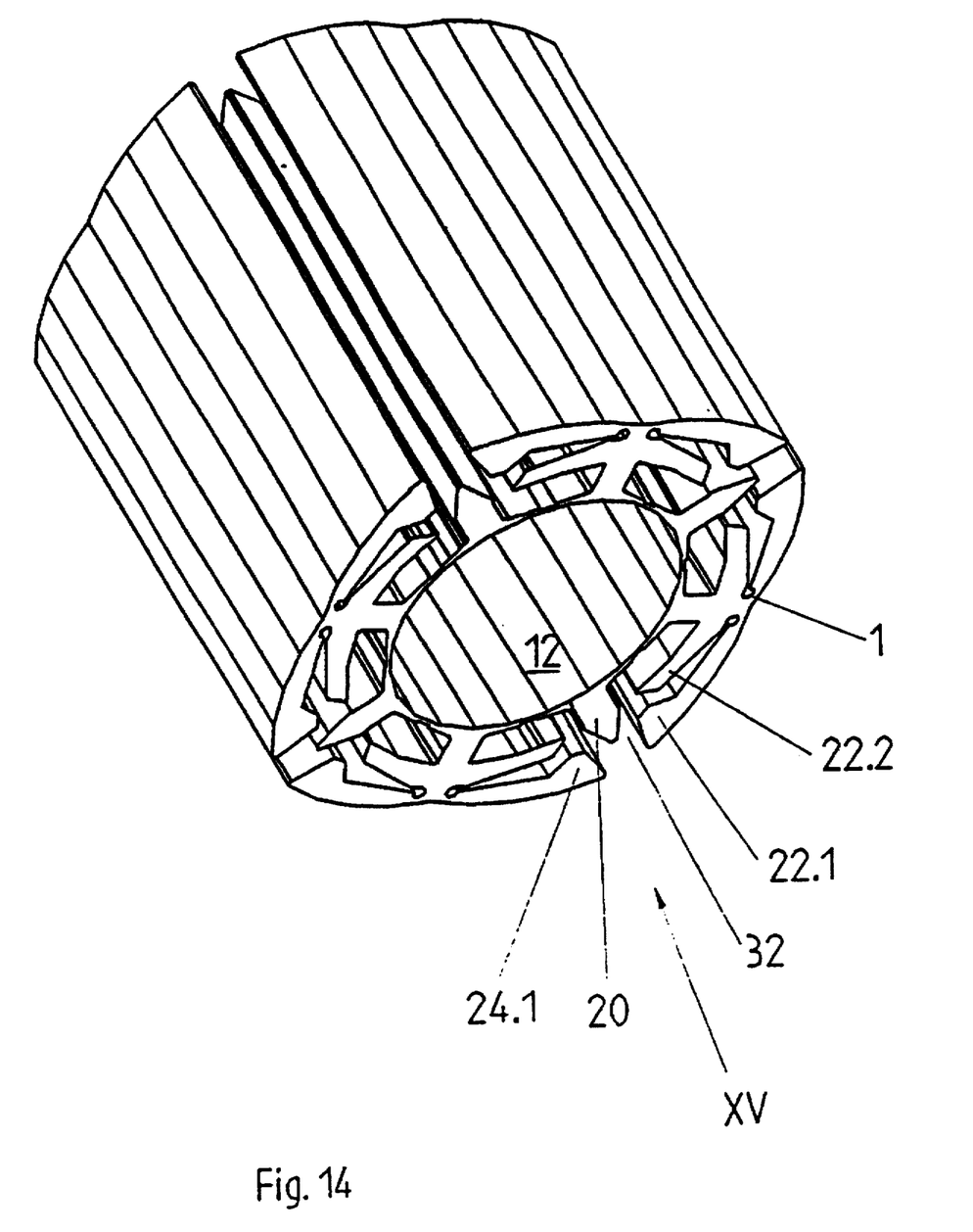
FIG. 14: a perspective view of a further stator plate packet.
Figure 15:
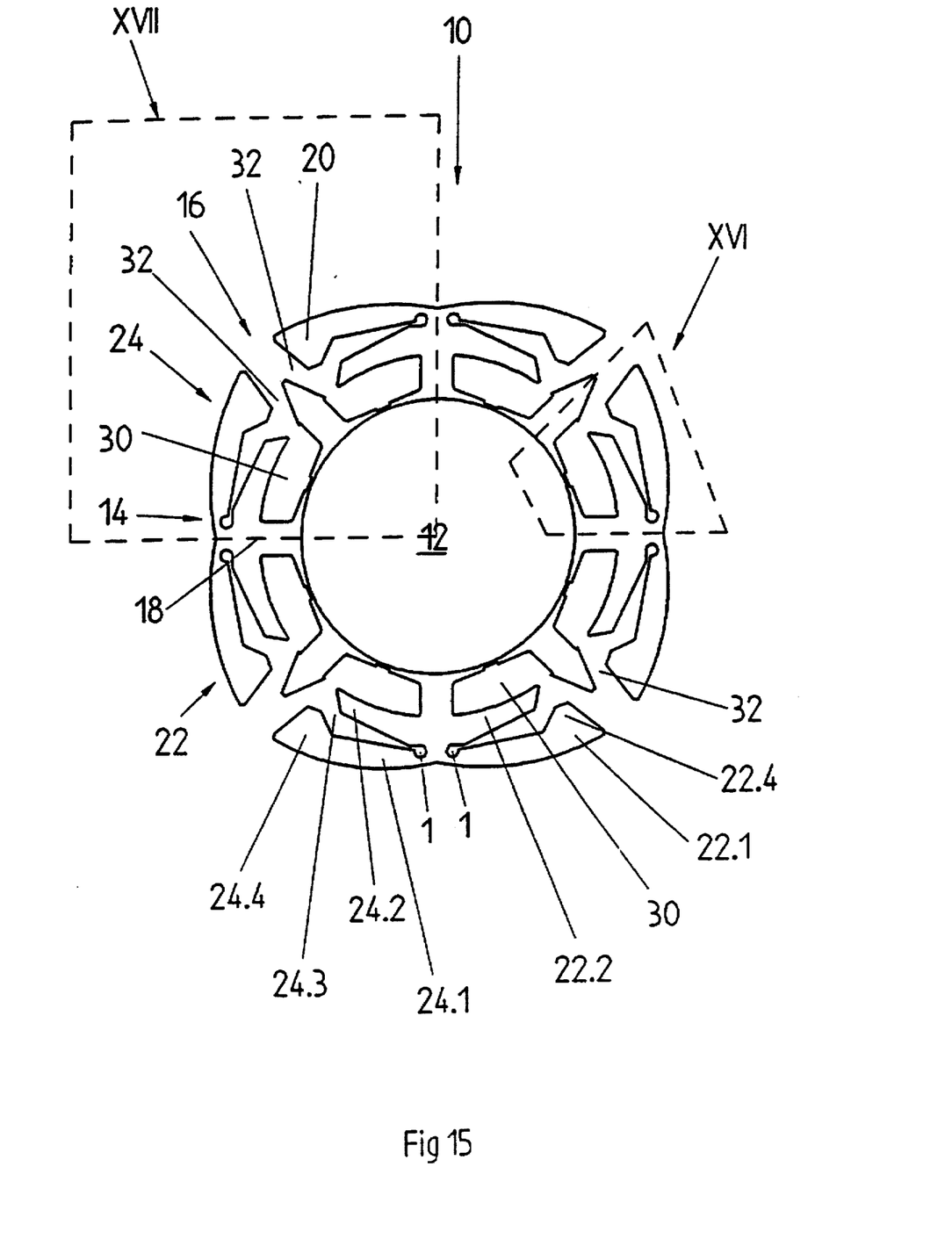
FIG. 15: an elevation in the direction of the arrow XV according to FIG. 14.

Thereupon a plurality of discs are combined to form a packet (FIG. 10) and the winding grooves 30 are covered with plastic. Simultaneously the two hollow cylindrical shafts 6 disposed axially at the ends are moulded on, simplifying securing of the packet during winding. Then the radially inward webs can be removed by cutting, machining or turning. Such a disc plate packet is then wound, and finally the openings 32 are closed by bending the legs 18, 20 and/or the arms 22, 24. Thus there is obtained a compact unit which requires no reinforcing rings or additional parts. In the case of larger stators it may be appropriate rigidly to interconnect the legs and arms in contact with one another e.g. by welding, soldering or gluing.

I claim:

1. A disk for the magnetic circuit of an electrodynamic motor, comprising (i) a central opening having a diameter, (ii) a plurality of legs extending radially from said central opening and being peripherally spaced from each other, (iii) even alternate ones of said legs each formed with outer arms, said arms peripherally extending in opposite directions from each other, (iv) odd alternate ones of said legs each having a radially outer free end, (v) each of said outer arms having a peripheral free end for forming a slot between the peripheral free end and an adjacent radially outer free end adjacent to alternate ones of said peripheral free ends, (vi) a winding groove disposed between each leg, each of said winding grooves being accessible from the outside through said slot, and (vii)(a) the radially outer free ends each of said odd alternate legs having groove dividing said free end into two radially outward extending parts for bending each such outward extending part toward an adjacent end of said peripheral free end of an adjacent outer arm for closing the slot, or (b) the peripherally free ends of each leg being bendable toward an adjacent radially outer free end for closing the slot.

2. The disk of claim 1, wherein said (i) odd alternate ones of said legs, (ii) said outer arms, or (iii) both said legs and said outer arms are made of a flexible material.

3. The disk of claim 1, wherein the width of the slot is larger than the diameter of the wire to be used for winding in said groove.

4. The disk of claim 1, wherein said slot is a radially open slot.

5. The disk of claim 1, wherein each of said outer arms has a bending site in a predetermined location thereon.

6. The disk of claim 1, wherein said slot is tapered for a radially inward enlargement.

7. The disk of claim 6, wherein said radially outer free end has a radially outwardly narrowing tapered end, and each of said peripherally free ends of said outer arms are tapered widening radially inwardly, whereby said tapered peripherally free ends of said outer arms when bent inwardly toward said tapered radially outer free ends form a weldable closure of said slot.

8. The disk of claim 7, wherein each of said even alternate legs is formed with two inner peripherally extending inner arms disposed opposite to each other, said inner arms being disposed radially inwardly from said outer arms, said inner arms, said peripherally outer free ends of said outer arms having an inside surface for establishing contact with the radially outer adjacent surface of an inner arm when said weldable closure is formed.

9. The disk of claim 1, wherein one or more of said winding grooves is provided with a radially inward extension toward said central opening.

10. The disk of claim 9, wherein said winding groove and said radially inward extension is lined with an insulating material.

11. The disk of claim 10 when after assembly with like disks into a stator packet, wherein the diameters of the central openings of the disks in the stator packet are enlarged so that said radially inward extension of each disk and the insulating lining therein extend to said central opening.

12. A process for making a stator packet from a plurality of disks each of which comprises, (i) a central opening having a diameter, (ii) a plurality of legs extending radially from said central opening and being peripherally spaced from each other, (iii) even alternate ones of said legs each formed with outer arms said arms peripherally extending in opposite directions from each other, (iv) odd alternate ones of said legs each having a radially outer free end, (v) each of said outer arms having a peripheral free end for forming a slot between the peripheral free end and an adjacent radially outer free end adjacent to alternate ones of said peripheral free ends, (vi) a winding groove disposed between each leg, each of said winding grooves being accessible from the outside through said slot, and (vii)(a) the radially outer free ends each of said odd alternate legs having a groove dividing said free end into two radially outward extending parts for bending each such outward extending parts for bending each such outward extending part toward an adjacent end of said peripheral free end of an adjacent outer arm for closing the slot, or (b) the peripherally free ends of each leg being bendable toward an adjacent radially outer free end for closing the slot, the process comprising placing a predetermined plurality of disks adjacent to each other to form a stator packet having opposed ends, lining the winding grooves of the assembled disks with an insulating material, winding a wire into said lined grooves, closing the slots of the disks in the stator packet, and optionally applying a hollow cylindrical shaft to the opposed ends of the stator packet.

13. The process of claim 12, wherein the stator packet is assembled from disks in which each of said winding grooves is provided with a radially inward extension toward said central opening, further comprising enlarging the diameter of said central opening to expose the radially inward bottom of each radially inward extension to said central opening.

* * * * *